UNITED STATES PATENT OFFICE.

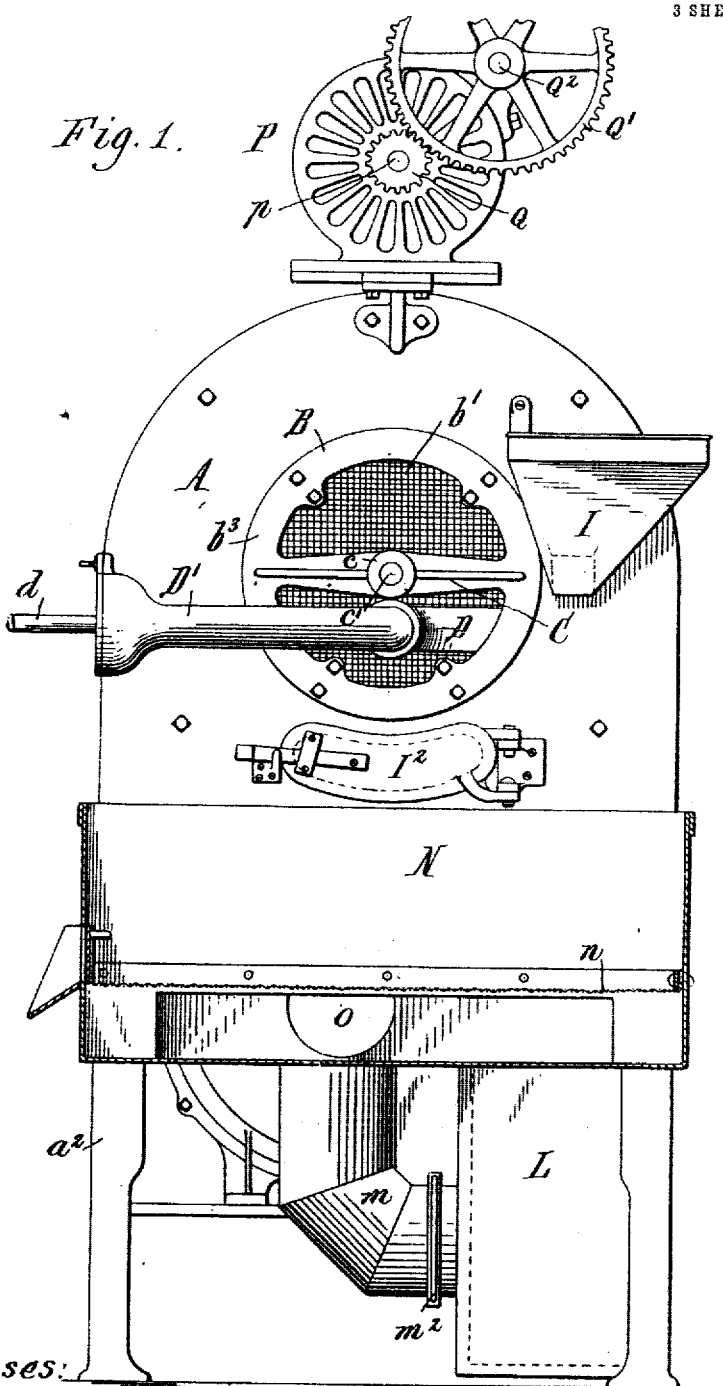

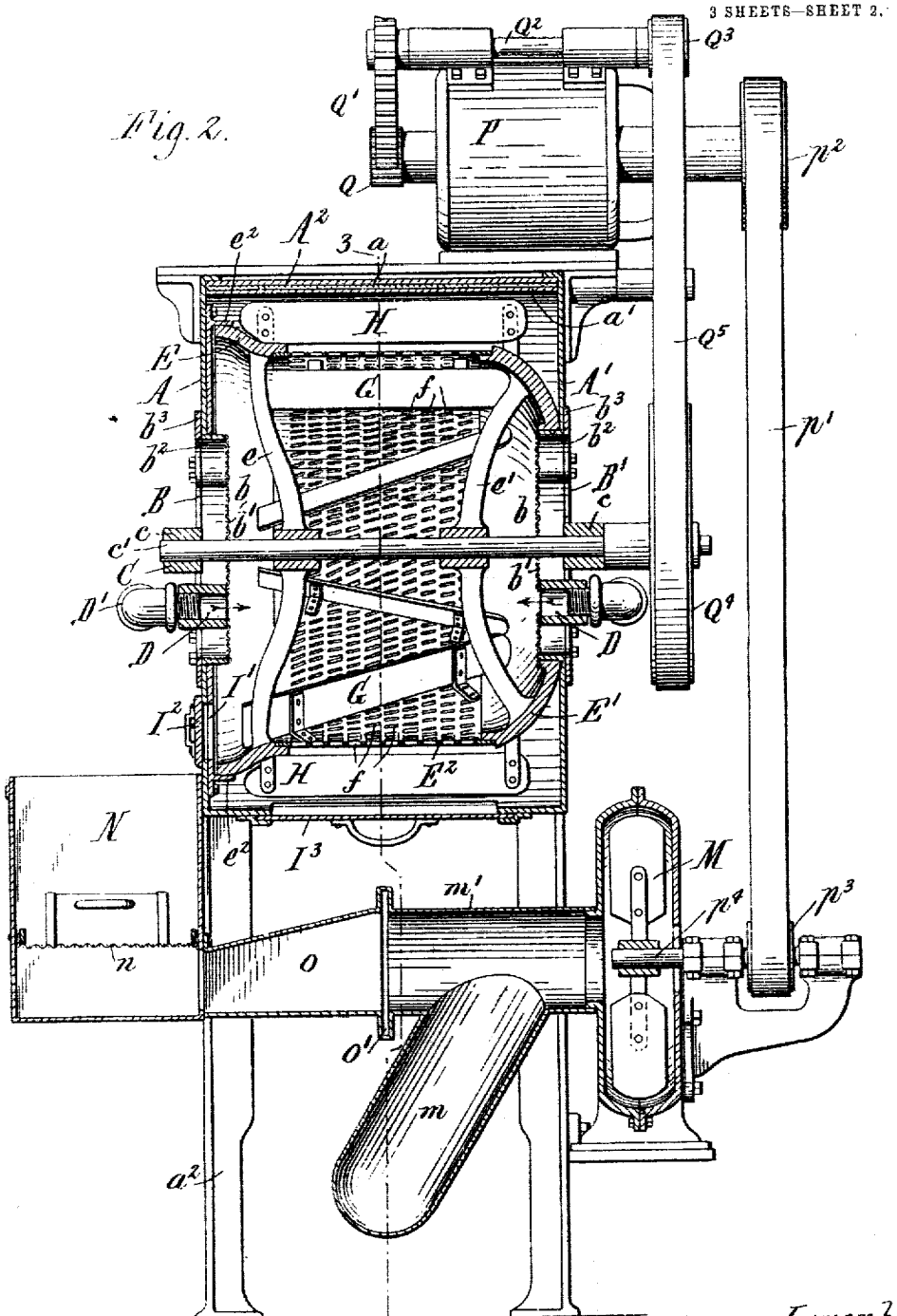

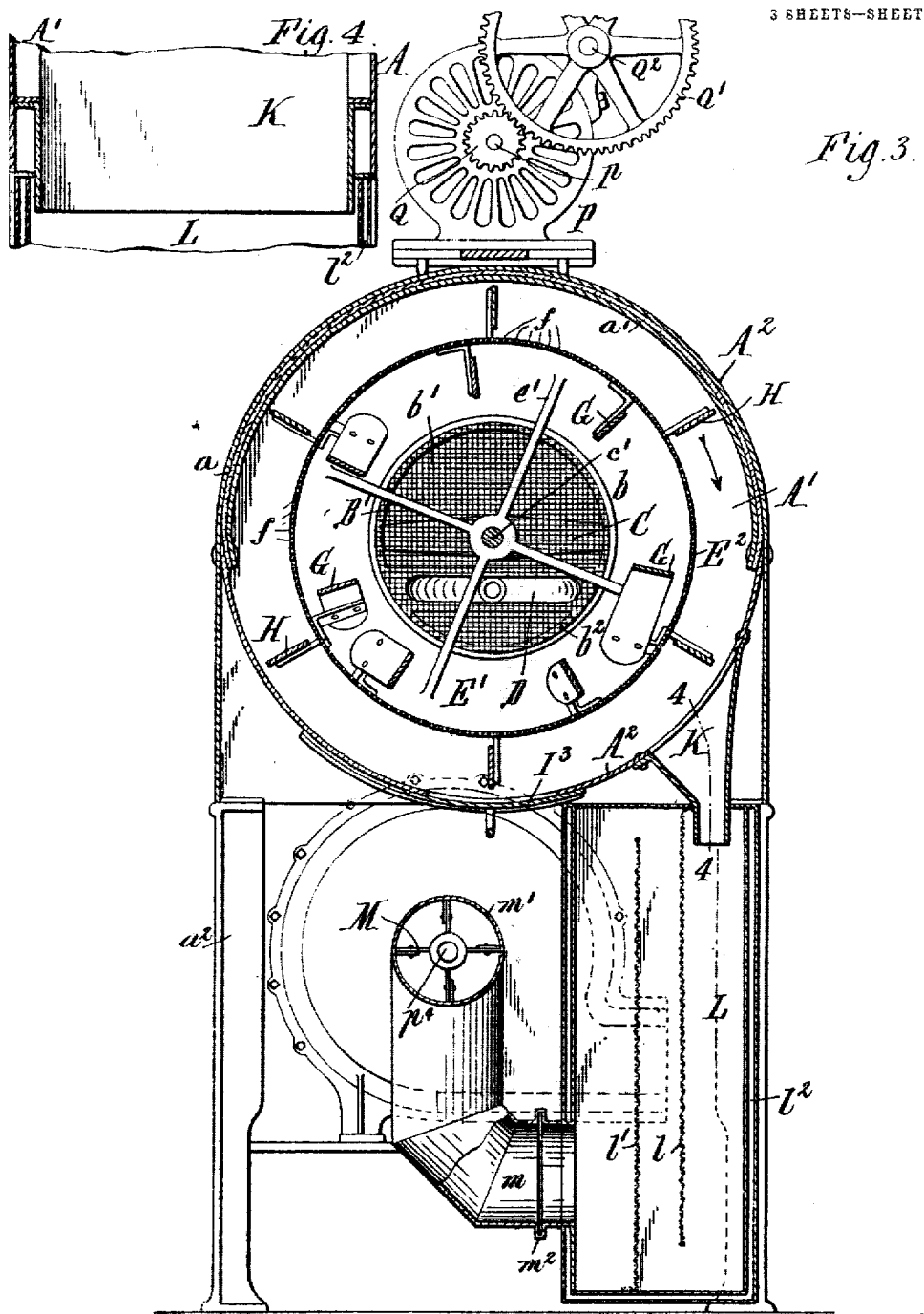

FRANK T. HOLMES, OF BROOKLYN, NEW YORK, ASSIGNOR OF ONE-HALF TO HUNTLEY MANUFACTURING COMPANY, OF SILVERCREEK, NEW YORK.

COFFEE-ROASTING MACHINE.

No. 812,268.   Specification of Letters Patent.   Patented Feb. 13, 1906.

Application filed July 12, 1905. Serial No. 269,310.

*To all whom it may concern:*

Be it known that I, FRANK T. HOLMES, a citizen of the United States, residing at Brooklyn, in the county of Kings and State of New York, have invented a new and useful Improvement in Coffee-Roasting Machines, of which the following is a specification.

This invention relates to that class of coffee-roasting machines which contain a perforated drum in which the berries are subjected to the heat generated by one or more gas-flames and in which air is drawn into the drum by an exhaust mechanism which is connected with the casing by which the drum is surrounded, so that the air which enters the drum becomes heated by the flame and passes, mixed with the hot gases, outwardly through the perforations of the drum into the space between the drum and the casing and thence to the exhaust.

The objects of this invention are to create a strong and uniform outward draft through the perforations of the drum and to prevent the accumulation of chaff in the space between the drum and the casing, to provide simple and effective means for separating the chaff from the air-current, to improve the driving mechanism, and to improve the machine in other respects.

In the accompanying drawings, consisting of three sheets, Figure 1 is a front elevation of the machine. Fig. 2 is a longitudinal sectional elevation. Fig. 3 is a vertical cross-section in line 3 3, Fig. 2. Fig. 4 is a fragmentary longitudinal section through the exhaust-spout and casing in line 4 4, Fig. 3.

Like letters of reference refer to like parts in the several figures.

The inclosing casing, in which the roasting-drum is arranged, consists, preferably, of an annular front head A, an annular rear head A', and a connecting cylindrical shell $A^2$. The upper portion of the shell is preferably provided with a protective lining $a$, of asbestos or other suitable material, held in place by a metallic lining $a'$. The casing is supported at a suitable height by a base-frame $a^2$.

Each of the heads A A' is provided with a central opening $b$, in which is secured a flanged annular frame B B', respectively, which is covered on its inner side by a screen $b'$, of wire-cloth or other suitable material. The marginal portion of the annular frame is preferably composed of a flange $b^2$ and a collar $b^3$, connected by bolts. Each frame is provided with a bridge-tree C, having a bearing $c$, in which the horizontal shaft $c'$ of the roasting-drum is journaled. Each annular frame is provided with a gas-burner D, which is arranged transversely below the bearing $c$ and opens inwardly through the screen $b'$, so as to project a horizontal sheet of flame into the drum. The mixture of air and gas is supplied to the burner, which is of the well-known atmospheric kind, by the usual mixing-tube D', which receives the gas from a pipe $d$.

The roasting-drum is composed of an outwardly-flaring front head E, an outwardly-contracted rear head E', and a connecting perforated cylindrical shell $E^2$. The heads E E' are provided with spiders $e$ $e'$, respectively, by which they are secured to the shaft $c'$. The front head rotates within a flanged lining $e^2$, which is secured to the inner side of the front head A of the stationary casing and which forms a practically tight joint between the open front end of the drum and the front head of the casing. The rear head E' of the drum is contracted outwardly to fit around the inwardly-projecting annular frame B' of the rear head A' of the casing and forms a practically tight joint therewith. The perforations $f$ of the roasting-drum are preferably elongated and inclined to the axis of the drum, as shown, in order to scour the coffee-berries effectively. The drum is provided on its inner side with the usual elevating blades or wings G, which are arranged obliquely to the axis of the drum and alternately in opposite directions, so as to cause the coffee to move back and forth in the longitudinal direction of the drum as the coffee is being elevated and dropped. The drum is provided on its outer side with longitudinal wings or blades H, which sweep through the annular space between the drum and the inclosed casing.

I represents a feed-hopper of any suitable construction arranged on the front head A of the casing, and I' represents the discharge-opening in the front head closed by a door $I^2$. $I^3$ represents a slide in the bottom portion of the casing for giving access to the interior thereof.

K represents a suction-spout, which is arranged with its inlet-opening lengthwise in the side of the shell $A^2$ of the casing near the downwardly-moving side of the drum, so that the wings H of the drum will sweep the chaff through the space between the drum and the casing to the suction-spout. The latter extends practically from end to end of the casing and distributes the draft throughout the length thereof. The wings of the drum prevent the chaff from accumulating in the space between the drum and the casing and carry to the inlet of the suction-spout all chaff which may settle or drop out of the air-current. The suction-spout K extends downwardly from the casing to the top of a settling-chamber L, in which the bulk of the chaff is separated from the air. This settling-chamber is preferably provided with staggered upright screens $l\ l'$, the front screen $l$ having an opening at the bottom and the second screen $l'$ having an opening at the top, so that the air passes partly through the screens and partly in a baffled or zigzag course through the passages formed by the screens in the settling-chamber. The separated chaff is deposited in the chamber and removed from time to time. The chamber is preferably provided with a jacket $l^2$, which is kept filled with water for keeping the chamber cool. An air trunk or spout $m$ leads from the settling-chamber to a suction-spout $m'$, connected with the eye of the fan M, which is arranged at the rear side of the machine. The spout $m$ is provided with a damper $m^2$.

N represents the usual receiver or cooling-box for the roasted coffee arranged on the front side of the machine below the discharge opening I' and provided with the usual false bottom $n$ of wire-cloth or perforated metal.

O represents an air-trunk which leads from the space underneath the false bottom to the suction-spout $m'$ of the fan and which is provided with a damper O'.

The drum and the fan are preferably actuated from an electric motor P, which is mounted upon the stationary casing. The fan is driven directly from the armature-shaft $p$ by a belt $p'$, which runs around a pulley $p^2$ on this shaft and a pulley $p^3$ on the fan-shaft $p^4$. The drum is driven at a much slower speed than the fan by a gearing which comprises a pinion Q, secured to the armature-shaft, a gear-wheel Q' on a counter-shaft Q², a pulley Q³ on said counter-shaft, a pulley Q⁴ on the drum-shaft $c'$, and a belt Q⁵. A speed of from forty-five to fifty-five revolutions per minute for the drum-shaft and from eighteen hundred to two thousand per minute for the fan-shaft will give good results. The counter-shaft Q² is mounted on the motor and bears a fixed relation to the armature-shaft $p$, which is the driving-shaft, and both shafts bear a fixed relation to the stationary casing on which the motor is supported and to the perforated drum arranged in the casing, the whole forming a self-contained portable machine.

In the operation of this machine the gas-burners D project horizontal sheets of flame into the open ends of the drum. The internal elevating blades or wings alternately elevate the coffee and drop it through these sheets of flame. The suction of the fan draws the external air into the drum at both ends thereof through the screens $b'$ and draws the hot gases and heated air outwardly through the perforations of the drum into the annular space between the drum and the casing. The heated air and gases pass from the annular space outside of the drum, together with the chaff which has escaped through the perforations of the drum, through the suction-spout K into the settling-chamber L, in which the chaff is deposited partly by gravity and partly by the screening operation. The fan also draws an air-current from the cooling-box N through the spout $n'$ upon opening the damper O' when the roasted coffee has been discharged into the box.

I claim as my invention—

1. The combination of a perforated revolving drum, means for heating the same, an inclosing stationary casing, a suction-spout arranged in the side of the casing, lengthwise of the drum, and wings on the drum which sweep through the space between the drum and the casing and carry the chaff to said suction-spout, substantially as set forth.

2. The combination of a perforated revolving drum, means for heating the same, an inclosing stationary casing, a suction-spout arranged in the side of the casing, lengthwise of the drum and at the descending side of the same, wings on the drum which sweep through the space between the drum and the casing and carry the chaff to the suction-spout, a settling-chamber with which said spout is connected, and an exhaust-fan connected with said chamber, substantially as set forth.

3. The combination of a perforated, revolving, open-ended drum, a burner projecting a flame into the same, an inclosing stationary casing, a suction-spout arranged in the side of the lower portion of the casing and extending lengthwise of the drum, and a suction-fan connected with said spout, substantially as set forth.

4. The combination of a stationary inclosing casing having its front and rear heads provided with open annular frames for the admission of air and having a guard-flange on the inner side of the front head, and a perforated roasting-drum having its front end arranged adjacent to said guard-flange and having its rear end constructed to fit around the adjacent annular frame, substantially as set forth.

5. The combination of a stationary inclosing casing, having its front and rear heads provided with open annular frames for the admission of air and having a guard-flange on the inner side of the front head, a perforated roasting-drum having its front end arranged adjacent to said guard-flange and having its rear end fitted around the adjacent annular frame, a suction-spout connected with said casing, and a suction-fan connected with said spout, substantially as set forth.

6. The combination of a perforated roasting-drum, an inclosing stationary casing, a suction-spout arranged in the side of the casing, a settling-chamber connected with said spout, baffle-screens arranged in said chamber, and a suction-fan connected with said chamber, substantially as set forth.

7. The combination of a perforated roasting-drum, an inclosing stationary casing, a suction-spout arranged in the side of the casing, a settling-chamber connected with said spout, a cooling-chamber for the roasted coffee, a suction-fan, and spouts leading from said settling-chamber and said cooling-chamber to said suction-fan, substantially as set forth.

Witness my hand this 5th day of July, 1905.

FRANK T. HOLMES.

Witnesses:
HARRIET L. WHITE.
W. H. WHITE.